US008166451B2

(12) United States Patent
Gutz

(10) Patent No.: US 8,166,451 B2
(45) Date of Patent: Apr. 24, 2012

(54) SIMULTANEOUS STATIC ANALYSIS ON DISPARATE RESOURCE TYPES

(75) Inventor: Steven J. E. Gutz, Gloucester (CA)

(73) Assignee: International Business Machines Corporation, Armonk, NY (US)

( * ) Notice: Subject to any disclaimer, the term of this patent is extended or adjusted under 35 U.S.C. 154(b) by 1527 days.

(21) Appl. No.: 11/612,081

(22) Filed: Dec. 18, 2006

(65) Prior Publication Data

US 2008/0148245 A1 Jun. 19, 2008

(51) Int. Cl.
*G06F 9/44* (2006.01)
(52) U.S. Cl. .......................................... 717/103
(58) Field of Classification Search .......... 717/100–126; 709/204, 220, 223–224; 719/328; 705/7.25; 714/38.1, 38.14; 703/6; 715/220, 751
See application file for complete search history.

(56) References Cited

U.S. PATENT DOCUMENTS

| 5,706,452 | A * | 1/1998 | Ivanov ........................... 715/751 |
| 6,971,091 | B1 | 11/2005 | Arnold et al. | |
| 2004/0085354 | A1 * | 5/2004 | Massand ....................... 345/751 |
| 2004/0193703 | A1 * | 9/2004 | Loewy et al. ................. 709/220 |
| 2005/0262487 | A1 | 11/2005 | Pistoia et al. | |
| 2006/0004618 | A1 | 1/2006 | Brixius | |
| 2006/0235882 | A1 * | 10/2006 | Mateescu et al. .......... 707/104.1 |
| 2007/0073769 | A1 * | 3/2007 | Baikov et al. .............. 707/104.1 |

FOREIGN PATENT DOCUMENTS

JP 2004145381 A 5/2004

OTHER PUBLICATIONS

Cleary et al, "Combined Software Reconnaissance & Static Analysis Eclipse Visualization Plug-in" Vissoft'05, IEEE Internat'l Workshop @2005 pp. 121-122 <VisualPlugIn05.pdf>.*

John F. Smart, "Peer Code Reviews Made easy with Eclipse Plug-in" Jun. 18, 2006, pp. 1-8 , copyright 2005 <FSmart_Jun06.pdf>.*
Cheung et al., "Context Constraints for Compositional Reachability Analysis", ACM Transactions on Software Engineering and Methodology, vol. 5, No. 4, Oct. 1996, pp. 334-377.
Ivory et al., "The State of the Art in Automating Usability Evaluation of User Interfaces", ACM Computing Surveys, vol. 33, No. 4, Dec. 2001, pp. 470-516.

* cited by examiner

*Primary Examiner* — Tuan Anh Vu
(74) *Attorney, Agent, or Firm* — Daniel McLoughlin; Hoffman Warnick LLC

(57) ABSTRACT

A system and method is provided for offering simultaneous or concurrent static analysis on a software product or software project where the software product or project comprises disparate resource types, such as the Java® technology or C/C++ programming language. A key part of the invention is a framework allowing analysis "providers" to be integrated into a common framework. The rules for each type of analysis can be integrated into a common user interface where the user can act on any of them in the same way. The system has an interface for interfacing with the project set, numerous analysis components for each platform or technology being utilized by the project set. The system has a single user interface (UT) for offering to the user unified configuration settings, or rules, for configuring each analysis component so that the desired analysis of the project set can be accomplished by the system. Upon pressing an "Analyze" button, analysis will commence on the entire project set, where each file will be examined in a simultaneous or concurrent fashion. It further comprises a report generator component for producing a single unified results report such that the concurrent or simultaneous analysis of disparate resources concludes with the report generator producing a unified set of results for all of the analyses for each of the platforms or technologies.

18 Claims, 4 Drawing Sheets

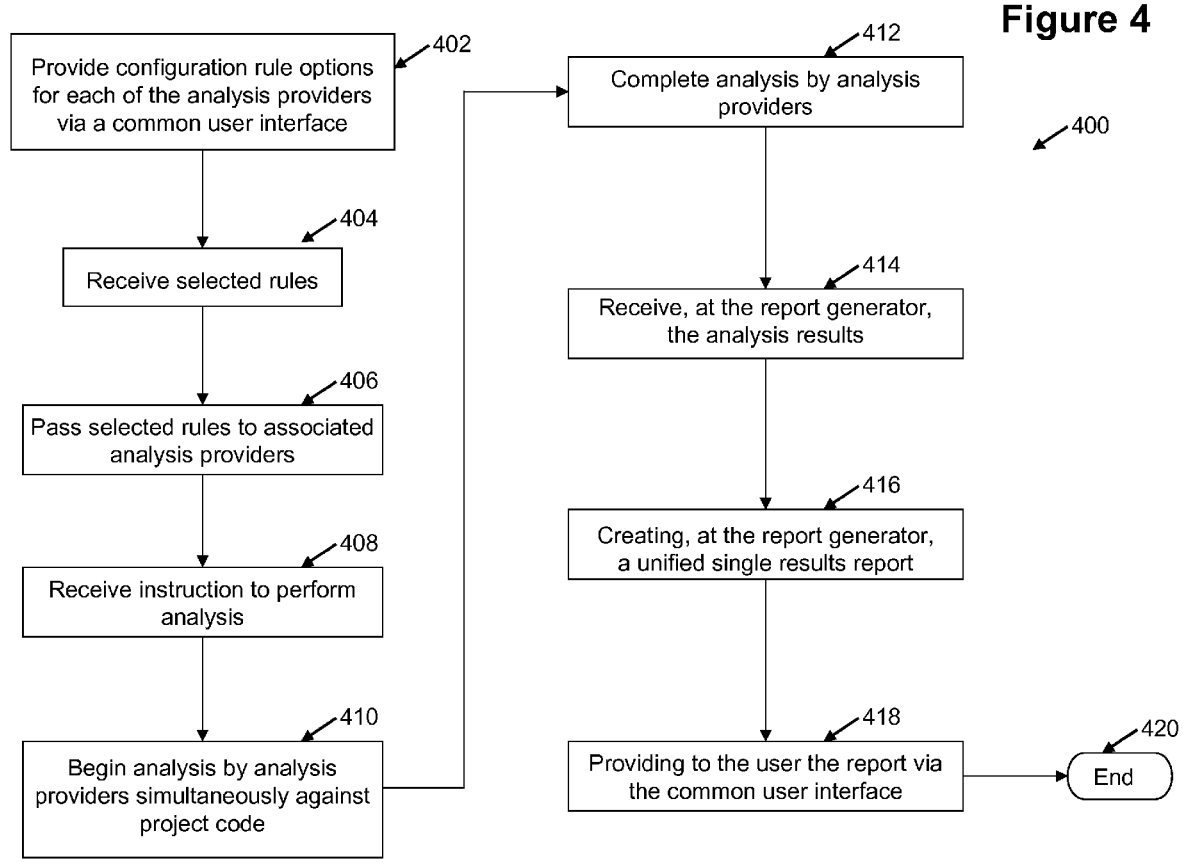

SIMULTANEOUS STATIC ANALYSIS ON DISPARATE RESOURCE TYPES

FIELD OF THE INVENTION

The invention relates generally to the analysis of software in a development environment, and, more particularly, to a system and method for providing simultaneous static analysis on disparate resource types.

BACKGROUND OF THE INVENTION

During the development of software, software is tested for many attributes such as the correctness, completeness, security, and quality of developed computer software. Testing is a process of technical investigation, performed on behalf of stakeholders, that is intended to reveal quality-related information about the product with respect to the context in which it is intended to operate. This includes, but is not limited to, the process of executing a program or application with the intent of finding errors. Quality is not an absolute; it is value to some person. With that in mind, testing can never completely establish the correctness of arbitrary computer software; testing furnishes a criticism or comparison that compares the state and behavior of the product against a specification. An important point is that software testing should be distinguished from the separate discipline of software quality assurance, which encompasses all business process areas, not just testing.

One type of software testing or analysis is static analysis (or static code analysis) which is the analysis of computer software that is performed without actually executing programs built from that software (analysis performed on executing programs is known as dynamic analysis). In most cases the analysis is performed on some version of the source code and in the other cases some form of the object code. The term is usually applied to the analysis performed by an automated tool, with human analysis being called program understanding or program comprehension. The sophistication of the analysis performed by tools varies from those that only consider the behavior of individual statements and declarations, to those that include the complete source code of a program in their analysis. Uses of the information obtained from the analysis vary from highlighting possible coding errors (e.g., the lint tool) to formal methods that mathematically prove properties about a given program (e.g., its behavior matches that of its specification).

There are many different types of static analyses which need to be performed on software during the course of design and development, such as Code Review, Architectural Discovery, Impact Analysis, Type State Analysis, etc. "Code Review" is systematic examination (often as peer review) of computer source code intended to find and fix mistakes overlooked in the initial development phase, improving overall code quality. Code reviews can often find and remove common security vulnerabilities such as format string attacks, race conditions, and buffer overflows, thereby improving software security. Online software repositories, like anonymous CVS, allow groups of individuals to collaboratively review code to improve software quality and security.

"Architectural Discovery" refers to the discovery and understanding of existing software architecture. Architects and developers often begin their work with existing code. They need to quickly review the application's structure and behavior prior to proceeding with new development as inherited applications often demonstrate execution performance problems or produce undesired side effects upon modification to the source if the existing architecture is not understood. These problems are often the result of developers unknowingly introducing unwanted dependencies during implementation, resulting in architectural decay.

There are many other types of analyses which the software architect or developer may wish to use on the software component or package—such as Deep Static Analysis, Type State Analysis, Impact Analysis, Runtime Data Analysis, etc. Each different analysis type provides the architect/developer with different data regarding the software component being tested/analyzed.

There are many static analysis vendors and tools available to handle such tests as Code Review, Architectural Discovery, Impact Analysis, Type State Analysis, etc. A listing of some of the vendors providing such tools can be found here: http://www.laatuk.com/tools/review_tools.html.

Furthermore, besides the different forms of analyses that need to be done on the software during the design and development of software, the analyses, many times, need to be implemented on various specific domains such as Java, C++, HTML and so on. For instance, in today's environment, software is becoming more and more complex combining and mixing software components from various and disparate sources. A group in a company may develop a component to perform a particular task and a totally independent group from the same or a different company may develop a second component to perform a different task. Likewise, many organizations (e.g., open source organizations, such as SourceForge.net and the Apache Software Foundation) offer software components which perform discrete functions for no cost use by others. Obviously, it is highly attractive to utilize such well-known, well-tested components rather than building new components for performing the same functions from scratch. However, the existing components many times are written in different languages for different platforms (e.g., Java, C++, etc.) so that, in order to analyze the end software product having many different types of components having disparate resource types require tools which can perform the desired tests for the desired language and domain. The different languages, different platforms and different technologies are considered, for the purposes of this application, to be disparate resource types. This is especially true in software projects which conglomerate disparate resource types to pull together a single resulting software project, that is to say, most major software projects contain a mélange of different technologies and development languages (i.e., disparate resource types)

Presently, in order to perform analysis on a complete project (having many different technologies and development languages), several different tools are needed. Users must analyze projects using different tools and operating modes, which limits their ability to accurately assess complete projects. For instance, when a new development or analysis tool is introduced, productivity often initially takes a hit. The tool may be difficult to install, to configure, or to learn. This may result in the perception that the new tool is simply too difficult to adopt which slows development down.

Another problem is that, with existing analysis tools, because multiple tools need to be used for the multi-resource software project, the analysis must be done in a serial manner. That is, one test is configured by the architect/developer using a first tool so that the first tool performs the test in the manner which the architect/developer wishes it to be performed. The test is performed and the analysis results are obtained. Next, a second test is configured by the architect/developer utilizing a second tool so that the second tool performs the test in the manner which the architect/developer wishes it to be performed. The test is performed and the analysis results are obtained and so forth.

This is undesirable for a number of reasons. The first, most obvious reason is the time wasted—both the architect's/developer's time and the development cycle's time. In today's software world, development cycles are dramatically shorter than they were even 5 years ago so there is no time to waste. Of course, the architect's process of configure test 1, run test 1, wait, receive results 1, configure test 2, run test 2, wait, receive results 2, and so on has the wasted "wait" time. In addition, during the course of running test 1 and waiting for results, the architect may lose focus by trying to utilize the wasted time by multitasking on other issues. This of course causes unnecessary churn and overhead utilized while the architect tries to refocus on the task at hand. It would be desirable to have each test run in parallel or concurrently to alleviate these problems.

Another problem with using multiple tools to perform the various tests on the various platforms is that the different tools will have different user interfaces. This means that the architect or developer performing the analysis will need to become versed or knowledgeable in each of the tools, from initial set up, to configuring the analysis and to configuring how the results will be laid out. This consumes yet more time which is unnecessary and causes much frustration on the user.

In view of the foregoing, a need exists to overcome these problems by providing a system and method for providing simultaneous static analysis on disparate resource types and provides a unified results report making the analysis much easier on the user.

BRIEF SUMMARY OF THE INVENTION

A system and method is provided for offering simultaneous or concurrent static analysis on a software product or software project where the software product or project comprises disparate resource types, such as the Java® technology or C/C++ programming language. A key part of the invention is a framework allowing analysis "providers" to be integrated into a common framework. The rules for each type of analysis can be integrated into a common user interface where the user can act on any of them in the same way.

In one embodiment, the system of the present invention has an interface for interfacing with the project set, numerous analysis components, such as a Code Review component, an Architectural Discovery component, Impact Analysis component, a Type State Analysis component, etc., for each platform or technology (such as Java or C++) being utilized by the project set. The system of this embodiment of the present invention further has a single user interface (UT) for offering to the user configuration settings, or rules, for configuring each analysis component so that the desired analysis of the project set can be accomplished by the system. For instance, a dialog may be provided to allow a user to select some C/C++ rules for a C++ Impact Analysis provider and also some Java rules for a Java Code Review Provider. Upon pressing an "Analyze" button, analysis will commence on the entire project set, where each file will be examined in a simultaneous or concurrent fashion. C/C++ files will be processed by the C++ Impact Analysis provider while detected Java files will be routed to the Java Code Review provider.

In another embodiment of the present invention, the system and method comprise a report generator component for producing a single results report such that the concurrent or simultaneous analysis of disparate resources concludes with the report generator producing a unified set of results for all of the analyses for each of the platforms or technologies.

The system and method of the present invention help improve the user experience, unify the analysis process and streamline the correction of reported problems by producing a single report containing all analysis results. This provides the user with a much better understanding of the overall quality of software regardless of the implementation language of type of analysis performed.

In another embodiment of the present invention, a platform is provided such that analysis tools may be "plugged in" (i.e., the tools would be "plug-ins" into the platform) so that other analysis tools, should they become necessary, can be added to the system and can be configured and utilized in a manner similar to the then existing analysis tools in the system.

Thus, the system and method of the present invention provide the following benefits to the user:
1. All forms of analysis on disparate resource types can be performed simultaneously with the same workflow.
2. Any analysis type can be integrated: Code Review, Architecture Discovery, Deep Static Analysis, Type State Analysis, Impact Analysis, Runtime Data Analysis, etc.
3. Results are produced in a single report regardless of the types of analysis being performed.
4. Analysis is focused on the project set rather than the resource types.
5. Improves the user experience for analysis source code and evaluating overall quality.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIG. 4 is a flowchart of the method of the present invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As used herein, unless otherwise noted, the term "set" means one or more (i.e., at least one) and the phrase "any solution" means any now known or later developed solution. Additionally, the term "data store" means any type of memory, storage device, storage system, and/or the like, which can temporarily or permanently store electronic data, and which can be included in a storage and/or memory hierarchy (collectively referred to herein as a "memory hierarchy") for a computer system.

Figure 1:
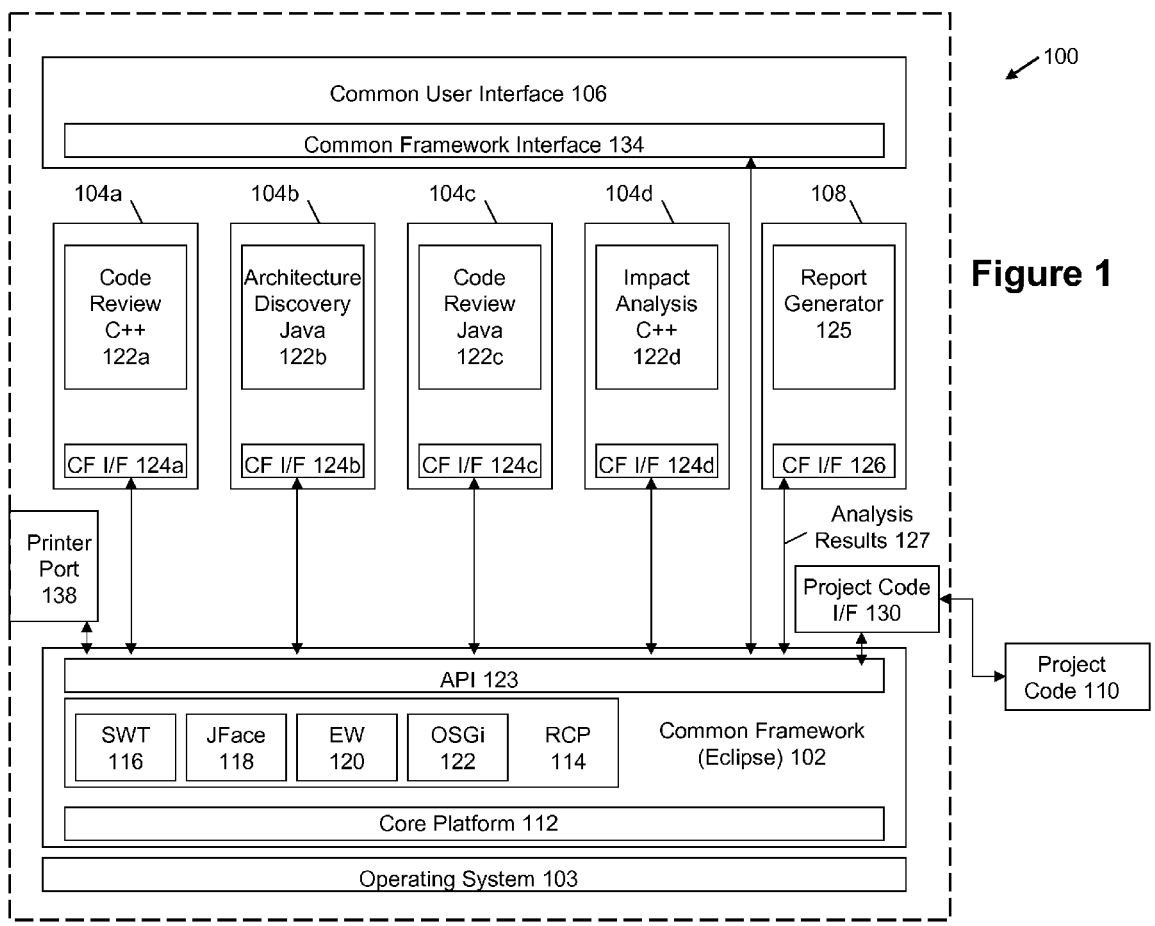
FIG. 1 is a block diagram of the system of the present invention.

Referring now to the figures, FIG. 1 illustrates an embodiment 100 of the present invention. System 100 has a common framework 102 sitting on top of the system's operating system (OS 103), one or more analysis providers—in this case, four analysis providers 104a, 104b, 104c, 104d and a common user interface 106. System 100 further has a report generator component 108 and a project code interface 130 for interfacing with the project code 110 to be analyzed. System 100 can also have any number of ports, such as printer port 138 for interfacing with a printer, but also would have other ports and peripherals which would be standard for any basic computer system such as a keyboard port (for interfacing with a keyboard—neither keyboard nor port is shown), a monitor port (for interfacing with a monitor—neither monitor nor port is shown), a CD port and drive or DVD port and drive (not shown) and many others. One of ordinary skill in the art understands the basics of computers including the elements of a computer as well as its basic functions and architecture so there is no need to discuss them here.

Common framework 102, in the preferred embodiment, is the Eclipse software framework. Eclipse is an open source platform-independent software framework for delivering "rich-client applications", as opposed to "thin client" browser-based applications. The basis for Eclipse is the Rich Client Platform (RCP) 114. The following components constitute the rich client platform:

Core platform 112—boot Eclipse, run plugins
OSGi 122—a standard bundling framework
the Standard Widget Toolkit (SWT) 116—a portable widget toolkit
JFace 118—file buffers, text handling, text editors
The Eclipse Workbench 120—views, editors, perspectives, wizards Eclipse's widgets are implemented by a widget toolkit for Java called SWT 116. The SWT 116 is a graphical widget toolkit for the Java platform. To display GUI elements, the SWT implementation accesses the native GUI libraries of the operating system using JNI (Java Native Interface) 117 in a manner that is similar to those programs written using operating system-specific APIs.

Eclipse's user interface also leverages an intermediate GUI layer called JFace, which simplifies the construction of applications based on SWT. JFace is defined by the Eclipse project as "a UI toolkit that provides helper classes for developing UI features that can be tedious to implement." It is a layer that sits on top of the raw widget system, and provides classes for handling common UT programming tasks.

Eclipse employs plugins in order to provide all of its functionality on top of (and including) the Rich Client Platform 114, in contrast to some other IDEs where functionality is typically hard coded. This plugin mechanism is a lightweight software componentry framework. The plugin architecture supports writing any desired extension to the environment, such as, in the present invention, providing additional analysis tool components to the system on an as-needed basis. Plugins interface with the common framework's application programming interface (API) 123. An API is the interface that a computer system, library or application provides in order to allow requests for services to be made of it by other computer programs, and/or to allow data to be exchanged between them. Open application programming interfaces (APIs) provide a standard interface, allowing third parties to create plugins that interact with the main application. A stable API allows third-party plugins to function as the original version changes and to extend the lifecycle of obsolete applications. More information on Eclipse can be found here: http://www.eclipse.org/.

Analysis Providers 104a, 104b, 104c, 104d are plugins for Common Framework 102. A plugin is a computer program that interacts with a main application (a web browser or an email program, for example, or in the present invention, Common Framework 102) to provide a certain, usually very specific, function. For instances, examples of very specific functions may be to read or edit specific types of files (for instance, multimedia files), to encrypt or decrypt email (for instance, PGP), or, as is the case with Plugins 104a, 104b, 104c, 104d, to perform a specific type of software analysis on a product or project set. The Common Framework 102 provides services which the Plugins 104a, 104b, 104c, 104d can use, including a way for Plugins 104a, 104b, 104c, 104d to register themselves with the Common Framework 102 and a protocol by which data is exchanged with Plugins 104a, 104b, 104c, 104d. Plugins 104a, 104b, 104c, 104d are dependent on these services provided by the Common Framework 102 and do not work by themselves. Conversely, the Common Framework 102 is independent of the Plugins 104a, 104b, 104c, 104d, making it possible for additional plugins to be added and updated dynamically without changes to the Common Framework 102.

For example Analysis Providers 104a, 104b, 104c, 104d shown in FIG. 1 perform the specific function as denoted by each Analysis provider's respective name:
Code review for C++ code Analysis Provider 104a;
Architecture discovery for Java code Analysis Provider 104b;
Code review for Java code Analysis Provider 104c; and
Impact analysis for C++ code Analysis Provider 104d.

It should be noted that these are merely examples of the various types of analysis providers which could be used with System 100. Other analysis provider plugins could be used as needed to perform the desired code and architecture analysis.

System 100 has another plugin—Report Generator Plugin 108—for receiving the Analysis Results 127 from each of the Analysis Providers 104a, 104b, 104c, 104d and creating a single, unified results report.

Each of the Plugins 104a, 104b, 104c, 104d and 108 has a Plugin Interface 124a, 124b, 124c, 124d and 126 for interfacing with Common Framework API 123. Further, each Plugin 104a, 104b, 104c, 104d and 108 has unique Code 122a, 122b, 122c, 122d and 125 for performing each own's specific functions.

Common User Interface 106 provides the means by which the users interact with System 100 by providing a means of input, allowing the users to manipulate the System 100 and to configure the analysis providers and the Report Generator 104a, 104b, 104c, 104d and 108 and a means of output, allowing the system to produce the effects of the users' manipulation and configuration.

Figure 2:
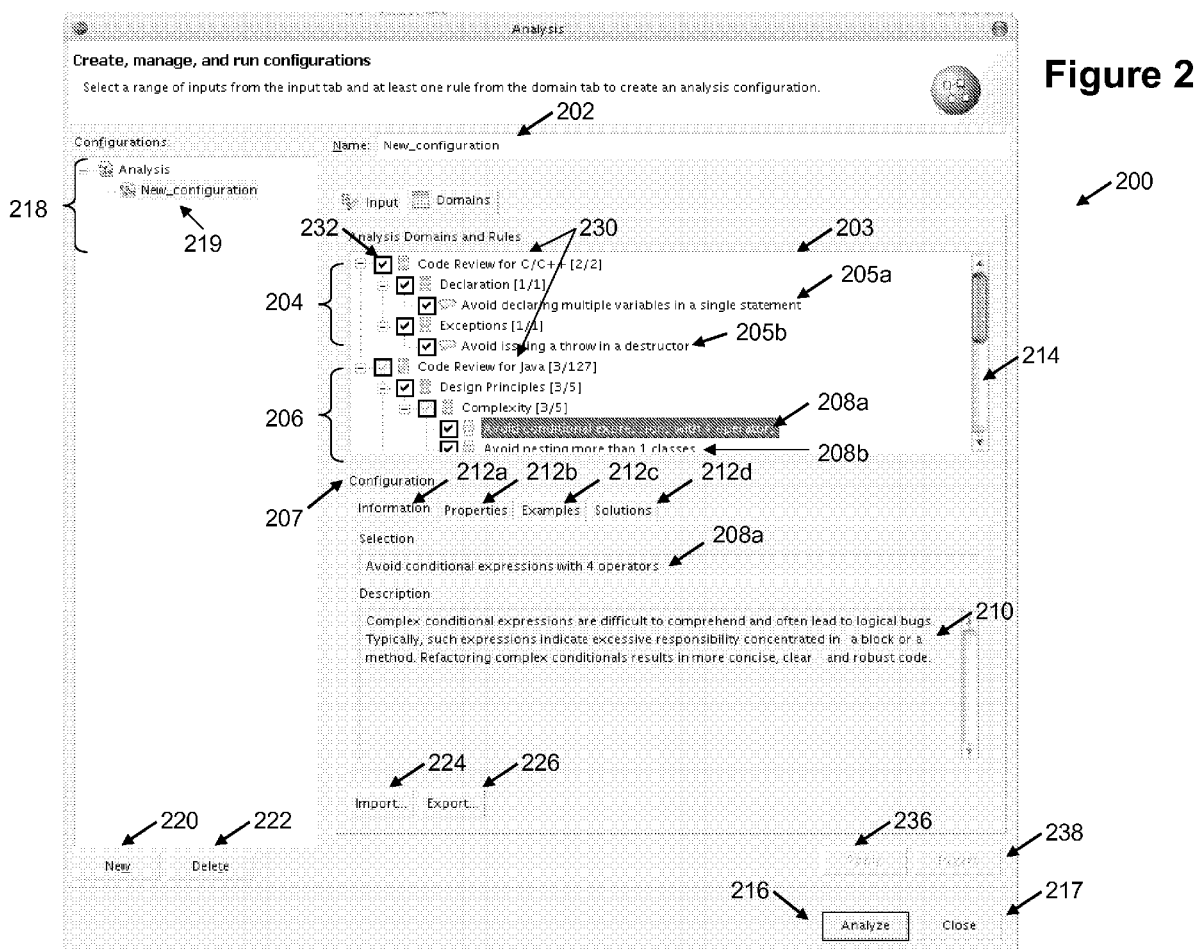
FIG. 2 is a depiction of a unified user interface for creating and modifying a configuration file which contains configuration settings for each of the analysis providers.

Referring now to FIG. 2, therein is illustrated a User Interface 200 provided by the Common User Interface 106 to a user to allow the user to create, manage or run configurations for the Analysis Providers 104a, b, c, d. The Left Navigator Panel 218 lists the configuration files which have been created and stored. As can be seen, only one configuration file, New_configuration 219, has been created and saved. User Interface 200 further has a Configuration Name Field 202 for selecting the name of an existing configuration file or for creating the name of a new configuration file. It further has an Analysis Domains and Rules Frame 203 where the analysis domains (resource types) and their corresponding rules may be selected. For instance, in the example, Analysis Domain and Rules 204 is for analysis domain C/C++ while Analysis Domain and Rules 206 is for analysis domain Java. Based upon the analysis type (for both domains, it is Code Review 230) and the analysis domain, the system provides the user with a selection of rules (see, e.g., Rules 205*a*, 205*b*, 208*a*, 208*b*) to choose from, the rules corresponding to the specific analysis type and the specific analysis domain as the selections differ depending upon the specific analysis type and the specific analysis domain. Using Scroll Bar 214, the user may scroll down the selections lists if more are available.

In the present example, the UI 200 provides Checkboxes 232 which the user may select or not select depending upon how he wishes to configure the analysis. Further, when a rule is selected, e.g., Rule 208*a*, a Configuration Frame 207 identifies the selected rule (e.g., Rule 208*a*) and provides a description in Description Field 210 when Tab 212*a* "Information" is selected. Configuration Frame 207 further has tabs "Properties" 212*b*, "Examples" 212*c*, and "Solutions" 212*d*. Configuration Frame 207 further has action buttons for "Import" 224 and "Export" 226 for importing or exporting analysis domains and rules.

User Interface 200 further has action buttons "New" 220 for creating a new configuration file, "Delete" 222 for deleting a selected configuration file, "Apply" 236 (grayed out in this example) for applying new configuration settings to a configuration file, and "Revert" 238 (grayed out in this example) for reverting the settings of the configuration file to the settings prior to the last series of changes, Action button "Analyze" 216, when selected or depressed, instructs the analysis providers to begin the analyses according to the selected configuration file simultaneously with one another. The "Close" action button 217 closes the open configuration file window.

Figure 3:
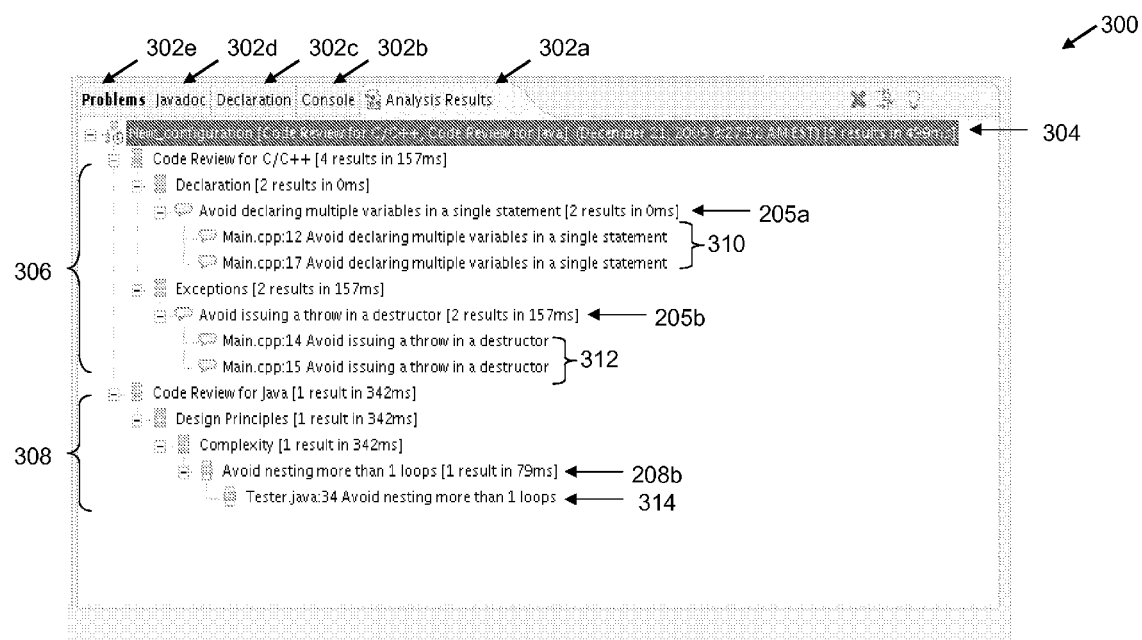
FIG. 3 is a depiction of a user interface for providing a unified results report to the user from each of the analysis providers.

Referring now to FIG. 3, therein is illustrated a User Interface 300 provided by the Common User Interface 106 to a user providing the user a unified single analysis report having the analyses performed by the Analysis Providers 104*a, b, c, d*. Like the Analysis Configuration UI 200, Analysis Results Report UI 300 is in tabbed table form having "Analysis Results" tab 302*a*, "Console" tab 302*b*, "Declaration" tab 302*c*, "JavaDoc" tab 302*d*, and "Properties" tab 302*e*. With "Analysis Results" tab 302*a* being selected, the analyses results after running New configuration file against the project code is shown. Line 304 indicates which file (New configuration) was run, the analysis domains and analyses types (Code Review for C/C++ and Code Review for Java) when it was run, the number of results and the time it took to run the analyses.

Analyses Results 306, 308 show the results for the code review for two disparate resource types—C/C++ (306) and Java (308). Under selected Rule 205*a*, there are two Results 310 indicating that, in these two spots, the selected rule was not followed. Likewise, for Rule 205*b* and Rule 208*b*, there were two results and one result respectively. From this unified report, the user (e.g., architect, developer) can obtain an overall picture of the project at one time—in contrast to the piecemeal approach of the prior art.

FIG. 4 illustrates the method of the preferred embodiment of the present invention. Method 400 starts at 402 where, at the unified common user interface, configuration rule options, or selections, are provided to the user for each analysis provider. At 404, at the common UI, receiving from the user the rules selections for each analysis provider. At 406, passing, from the common UI to each respective analysis provider, the selected rules associated with that analysis provider. At 408, at the common UI, receiving from the user an instruction for each analysis provider to perform the analysis in accordance with the selected rules. As discussed above, this instruction can take one of many forms such as depressing an "Analyze" action button. At 410, at each analysis provider, beginning the performance of the analysis in accordance with the selected rules, each analysis provider performing its respective analysis simultaneously with each other analysis provider. At 412, at each analysis provider, completing the analysis in accordance with the selected rules. At 414, receiving, at the report generator, the analysis results from each analysis provider. At 416, creating, at the report generator, a unified single results report based upon the analysis results from each analysis provider. At 418, the next step is to provide the unified single results report to the user via the common user interface. Of course, alternatively, the report could be printed out. At 420, the method 400 is complete.

Thus, it can be seen that the system and method of the present invention provide the following benefits to the user:
1. All forms of analysis can be performed simultaneously with the same workflow.
2. Any analysis type can be integrated: Code Review, Architecture Discovery, Deep Static Analysis, Type State Analysis, Impact Analysis, Runtime Data Analysis, etc.
3. Results are produced in a single report regardless of the types of analysis being performed.
4. Analysis is focused on the project set rather than the resource types.
5. The user experience is improved for analysis source code and evaluating overall quality.

In view of the foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for performing at least one form of static analysis on a software product where the software product comprises at least two disparate resource types, the system comprising:

at least two analysis providers for performing the at least one form of static analysis, each analysis provider corresponding to each of the at least two disparate resource types, each analysis provider accepting configuration settings, wherein the at least two disparate resource types comprise at least one of different programming languages, different platforms, and different technologies;

a common framework allowing the analysis providers to be integrated into the system; and a common user interface for receiving configuration settings from a user for the analysis providers during a single configuration process and for receiving an instruction for the analysis providers to perform the analysis simultaneously with one another and for passing the instruction to the analysis providers, wherein, upon receiving the instruction to perform the analysis, the analysis providers perform the analysis simultaneously according to each analysis provider's respective configuration settings; and wherein the common user interface provides a single unified user interface window for simultaneously displaying configuration selections pertaining specifically to each analysis provider so that the user may select configuration selections for each analysis provider in the single unified user interface window.

2. The system of claim 1 wherein each analysis provider, upon performing the configured analysis, produces a results set, the system further comprising a report generator for receiving the results sets from the analysis providers and providing a single, unified results report to the user.

3. The system of claim 2 wherein the single unified results report is provided to the user via the common user interface.

4. The system of claim 2 wherein the common framework is an Eclipse platform and the analysis providers and the report generator are plugins.

5. The system of claim 1 wherein the configuration settings are stored as a single configuration file, the system being able to run a subsequent analysis on project code using the configuration settings in the stored configuration file.

6. The system of claim 1 wherein the software product is a software project having multiple software products and software components conglomerated therein.

7. A method for performing at least one form of static analysis on a software product where the software product comprises at least two disparate resource types, the method comprising:
providing at least two analysis providers corresponding to each of the at least two disparate resource types, a common framework for integration of the analysis providers, and a common user interface, wherein the at least two disparate resource types comprise at least one of different programming languages, different platforms, and different technologies;
providing, at the common user interface, configuration settings options for each of the analysis providers to a user during a single configuration process, wherein the common user interface provides a single unified user interface window for simultaneously displaying configuration selections pertaining specifically to each analysis provider so that the user may select configuration selections for each analysis provider in the single unified user interface window;
receiving, at the common user interface from the user, selected configuration settings for each of the analysis providers during the single configuration process;
receiving, at the common user interface from the user, an instruction for the analysis providers to perform the analyses in accordance with the selected configuration settings for each of the analysis providers and for the analysis providers to perform the analyses simultaneously with one another;
passing, from the common user interface to each of the analysis providers, the selected configuration settings associated with each of the analysis providers and the instruction to perform the analysis; and
based upon the instruction, performing, by each analysis provider, the analysis in accordance with the selected configuration settings simultaneously with each other analysis provider.

8. The method of claim 7 further comprising:
at each of the analysis providers, producing analysis results;
receiving the analysis results from the analysis providers at a report generator; and
providing a single, unified results report to the user.

9. The method of claim 8 wherein the providing the single, unified results report further comprises providing the single, unified results report to the user via the common user interface.

10. The method of claim 8 wherein the common framework is an Eclipse platform and the analysis providers and the report generator are plugins.

11. The method of claim 7 further comprising storing the configuration settings as a single configuration file such that the system is able to run a subsequent analysis on project code using the configuration settings in the stored configuration file.

12. The method of claim 7 further comprising providing, at the common user interface, an action button which, when depressed, indicates to the analysis providers to begin the configured analyses simultaneously.

13. A computer program comprising program code stored on a non-transitory computer-readable medium, which when executed, enables a computer system to implement a method for performing at least one form of static analysis on a software product where the software product comprises at least two disparate resource types, the method comprising:
providing at least two analysis providers corresponding to each of the at least two disparate resource types, a common framework for integrating the analysis providers, and a common user interface, wherein the at least two disparate resource types comprise at least one of different programming languages, different platforms, and different technologies;
providing, at the common user interface, configuration settings options for each of the analysis providers to a user during a single configuration process, wherein the common user interface provides a single unified user interface window for simultaneously displaying configuration selections pertaining specifically to each analysis provider so that the user may select configuration selections for each analysis provider in the single unified user interface window;
receiving, at the common user interface from the user, selected configuration settings for each of the analysis providers during the single configuration process;
receiving, at the common user interface from the user, an instruction for the analysis providers to perform the analyses in accordance with the selected configuration settings for each of the analysis providers and for the analysis providers to perform the analyses simultaneously with one another;
passing, from the common user interface to each of the analysis providers, the selected configuration settings associated with each of the analysis providers and the instruction to perform the analysis; and
based upon the instruction, performing, by each analysis provider, the analysis in accordance with the selected configuration settings simultaneously with each other analysis provider.

14. The computer program of claim 13 further comprising:
at each of the analysis providers, producing analysis results;
receiving the analysis results from the analysis providers at a report generator; and
providing a single, unified results report to the user.

15. The computer program of claim 14 wherein the providing the single, unified results report further comprises providing the single, unified results report to the user via the common user interface.

16. The computer program of claim 14 wherein the common framework is an Eclipse platform and the analysis providers and the report generator are plugins.

17. The computer program of claim 13 further comprising storing the configuration settings as a single configuration file such that the system is able to run a subsequent analysis on project code using the configuration settings in the stored configuration file.

18. The computer program of claim 13 further comprising providing, at the common user interface, an action button which, when depressed, indicates to the analysis providers to begin the configured analyses simultaneously.

\* \* \* \* \*